(12) United States Patent
Barber

(10) Patent No.: US 12,428,233 B2
(45) Date of Patent: Sep. 30, 2025

(54) PLATE ASSEMBLY FOR REMOVING A SECTION OF UNDERLYING SUBSTRATE

(71) Applicant: NABHOLZ CONSTRUCTION CORPORATION, Conway, AR (US)

(72) Inventor: Justin Barber, El Paso, AR (US)

(73) Assignee: Nabholz Construction Corporation, Conway, AR (US)

( * ) Notice: Subject to any disclaimer, the term of this patent is extended or adjusted under 35 U.S.C. 154(b) by 0 days.

(21) Appl. No.: 18/134,056

(22) Filed: Apr. 13, 2023

(65) Prior Publication Data

US 2024/0359923 A1   Oct. 31, 2024

(51) Int. Cl.
*B65G 7/12*   (2006.01)
*E01C 23/00*   (2006.01)

(52) U.S. Cl.
CPC .............. *B65G 7/12* (2013.01); *E01C 23/00* (2013.01)

(58) Field of Classification Search
CPC ....... E04G 21/167; E04G 21/162; B65G 7/12; B66F 13/00
See application file for complete search history.

(56) References Cited

U.S. PATENT DOCUMENTS

| | | | | |
|---|---|---|---|---|
| 3,172,586 A | * | 3/1965 | Lu .............................. | A45F 5/12 294/155 |
| 3,180,513 A | * | 4/1965 | Vander Wal .............. | B66F 9/12 414/607 |
| 3,861,649 A | * | 1/1975 | Mosley .................... | B25B 27/02 254/124 |
| 4,261,548 A | * | 4/1981 | Kaderabek .............. | B66F 15/00 254/131 |
| 4,712,804 A | * | 12/1987 | Harrison, Jr. ............ | B65G 7/12 280/47.131 |
| 4,802,813 A | * | 2/1989 | Perry ..................... | E04G 21/167 294/131 |
| 5,220,980 A | * | 6/1993 | Petter ..................... | B65D 19/38 414/785 |
| D657,241 S | * | 4/2012 | Nidetz .......................... | D9/434 |
| 8,444,366 B2 | * | 5/2013 | Cole ......................... | B66F 9/18 414/785 |
| 8,459,897 B1 | * | 6/2013 | Knapp .................... | E01C 23/12 404/78 |

(Continued)

FOREIGN PATENT DOCUMENTS

CN    110617010 B    6/2020

*Primary Examiner* — Michael A Riegelman
(74) *Attorney, Agent, or Firm* — Hall Estill Law Firm

(57) ABSTRACT

Method and apparatus for lifting and removing substrate, such as a cut section from an underlying concrete slab. A plate assembly has a planar support plate and a u-shaped support bracket extending therefrom. The support plate is placed onto the section to be removed. The support bracket has adjoining first, second and third web portions to define an interior channel above the support plate. First and second apertures extend through the support plate on opposing sides of the support bracket and are used to secure the support plate to the cut section using attachment mechanisms such as anchor bolts. A lifting mechanism such as a fork lift inserts a fork through the interior channel to lift the plate assembly and cut section. The interior channel may be contoured to facilitate centering of the fork during lifting and movement of the plate assembly and the cut section.

20 Claims, 6 Drawing Sheets

(56) References Cited

U.S. PATENT DOCUMENTS

| | | | | |
|---|---|---|---|---|
| 8,651,540 | B2* | 2/2014 | Daniel | B66C 1/54 |
| | | | | 294/95 |
| 9,493,331 | B2* | 11/2016 | Montgomery | B65G 7/12 |
| 10,227,218 | B1* | 3/2019 | Stone | E04G 21/147 |
| 10,648,139 | B2* | 5/2020 | Knapp | E01C 7/147 |
| 2004/0108738 | A1* | 6/2004 | Marry | B66F 9/18 |
| | | | | 414/785 |
| 2006/0117678 | A1* | 6/2006 | Neighbours | E04B 1/3511 |
| | | | | 52/125.1 |
| 2012/0153654 | A1* | 6/2012 | Cole | B66C 9/18 |
| | | | | 294/119.1 |
| 2014/0290169 | A1* | 10/2014 | McCuen | E04G 23/0288 |
| | | | | 52/514.5 |
| 2024/0344346 | A1* | 10/2024 | Barber | E04G 21/142 |
| 2024/0359923 | A1* | 10/2024 | Barber | B66F 13/00 |

* cited by examiner

PLATE ASSEMBLY FOR REMOVING A SECTION OF UNDERLYING SUBSTRATE

BACKGROUND

Substrates such as slabs, foundations, roadways, etc. are often formed of concrete or other aggregate-based, solid material. The material may initially take the form of a liquid or slurry that is poured into a form and allowed to harden in place (cure). Reinforcement bars (rebar) or other reinforcing structures may be laid out within the form prior to the pouring operation so as to be embedded into the final cured structure.

Depending on the construction methodology used, these and other types of substrates can be dense, durable, and can handle extremely high compressive and/or tensile loads. However, such substrates can also be difficult to remove, such as during repair operations where a section of the substrate is removed and repoured to address a localized damaged area, or demolition operation where the entire substrate is removed to either reclaim an area or construct a new, replacement substrate.

A variety of substrate repair and replacement techniques have been utilized in the art. One approach uses an impact tool such as a jackhammer to break up the substrate, the resulting pieces are moved via heavy equipment or hand. Another approach is to cut the substrate into smaller sections and use lifting equipment to lift the pieces out, such as by attaching chains or other attachment mechanisms to the cut sections.

While operable, sections of a substrate can be heavy, often weighing several hundreds or even thousands of pounds or more depending on dimensions and density of the substrate material. As a result, substrate removal can be a potentially dangerous situation for the personnel carrying out the removal operation, as well as potentially destructive to the property or equipment involved in the removal operation.

SUMMARY

Various embodiments are generally directed to systems and methods for removing portions of a substrate, such as but not limited to a concrete slab, a foundation, a roadway, etc.

Without limitation, some embodiments provide an apparatus having a support plate configured for contacting placement upon a section of an underlying substrate. The support plate has an outermost perimeter with a width, a length and a thickness, and may be rectangular or some other suitable shape. A first aperture is provided on a first side of a centerline of the support plate that bisects the length and a second aperture is provided on an opposing second side of the centerline. Each of the first and second apertures extend through the thickness of the support plate to accommodate a corresponding attachment mechanism that extends through the aperture to secure the plate to the section of the underlying substrate.

A support bracket extends upwardly from a medial portion of the support plate opposite the section of the underlying substrate and between the first and second apertures. The support bracket defines an interior channel using a first web portion on the first side of the centerline, a second web portion on the second side of the centerline and a third web portion substantially parallel to the support plate that adjoins the first and second web portions. The interior channel accommodates insertion of a fork of a lifting mechanism, such as a fork lift, to contactingly engage a downwardly facing support surface of the third web portion and lift the support plate and section of the underlying substrate to a desired height.

In related embodiments, a plate assembly is provided to lift a cut section from an underlying concrete slab. The plate assembly has a rectangular support plate configured for contacting placement onto the cut section so that a centerline of the support plate nominally aligns with a center of gravity (COG) of the cut section. The support plate has opposing first and second through-hole apertures that extend through a thickness of the support plate on opposing sides of the centerline.

A support bracket extends from the support plate and has adjoined first, second and third web portions to define an interior channel. The first and second web portions extend upwardly from the support plate on opposing sides of the centerline and between the centerline and the first and second apertures. The third web portion extends parallel to the support plate to adjoin each of the respective first and second web portions. The interior channel is sized and shaped to receive insertion of a fork of a lifting mechanism.

First and second attachment mechanisms are configured for insertion through the respective first and second through-hole apertures in the support plate to secure the support plate to the cut section. A user handle extends upwardly from a medial location of the support bracket to enable a human operator to place the support plate onto the cut section.

In further related embodiments, a method is provided having the following steps: placing a plate assembly onto a cut section from an underlying concrete slab, the plate assembly comprising a support plate and a support bracket that extends from a medial portion of the support plate with adjoined first, second and third web portions to define an interior channel, the support plate further having first and second through-hole apertures on opposing sides of the support bracket; securing the plate assembly to the cut section using first and second attachment mechanisms that extend through the first and second through-hole apertures and into the cut section; inserting a fork of a lifting mechanism into the interior channel; and raising the fork of the lifting mechanism to contactingly engage a downwardly facing interior surface of the third web portion and lift the plate assembly and the cut section from the underlying concrete slab.

These and other features and advantages of various embodiments can be understood from a review of the following detailed description in conjunction with a review of the accompanying drawings.

DETAILED DESCRIPTION

Various embodiments of the present disclosure are generally directed to the removal of some, or all, of an underlying substrate. While a concrete slab is presented as an exemplary substrate that is particularly suitable as an operational environment, substantially any form of substrate can be processed in accordance with the various embodiments described herein, including but not limited to polymers, ice, metal, etc.

Figure 1:
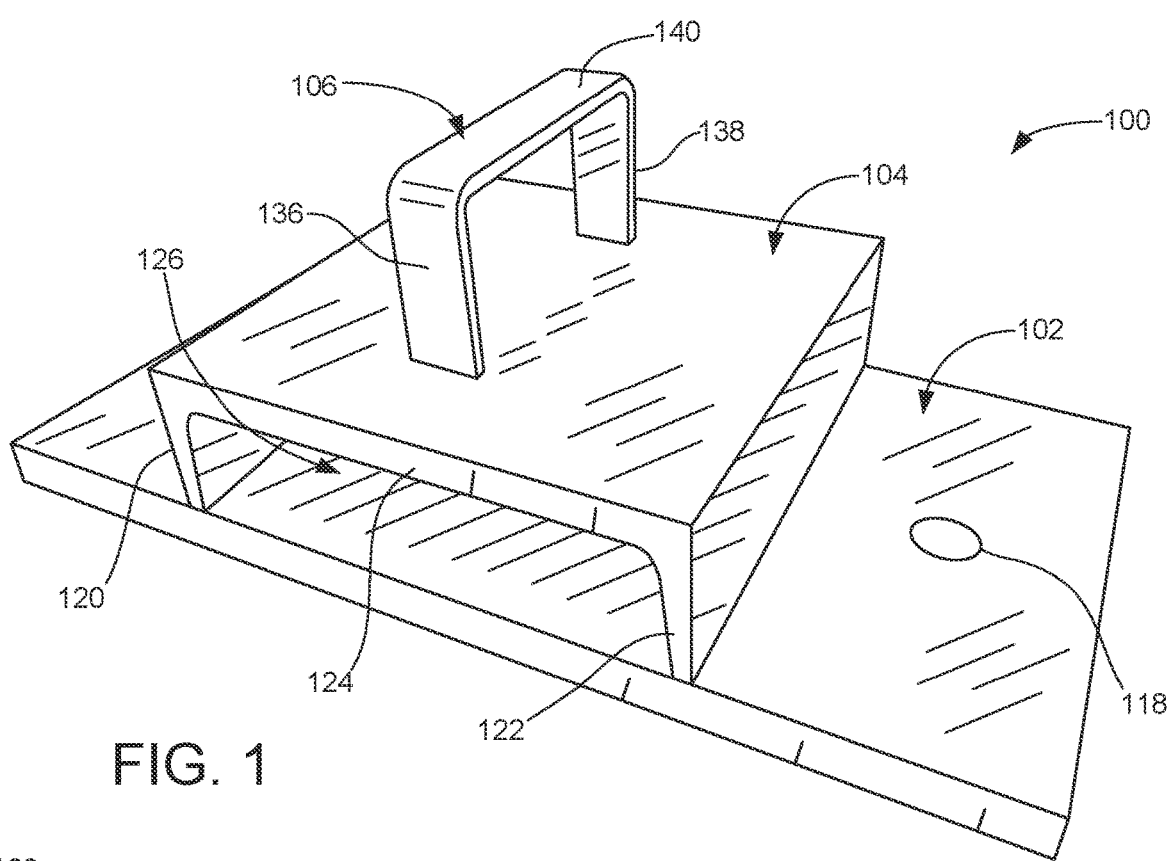
FIG. 1 is a perspective representation of a substrate removal plate constructed and operated in accordance with various embodiments of the present disclosure.

FIG. 1 shows a perspective view of a substrate removal plate assembly 100 constructed and operated in accordance with some embodiments. The assembly 100, also sometimes referred as a plate assembly or a removal plate, includes a planar support plate 102, a generally u-shaped support bracket 104 that extends upwardly from the support plate 102, and a generally u-shaped handle 106 that extends upwardly from the support bracket 104.

The plate assembly 100 is formed of a suitably strong, rigid and load bearing material such as steel, and the various elements may be adjoined using welding or some other suitable attachment mechanism. It will be noted that such attachments have been omitted for simplicity of illustration.

Figure 2:
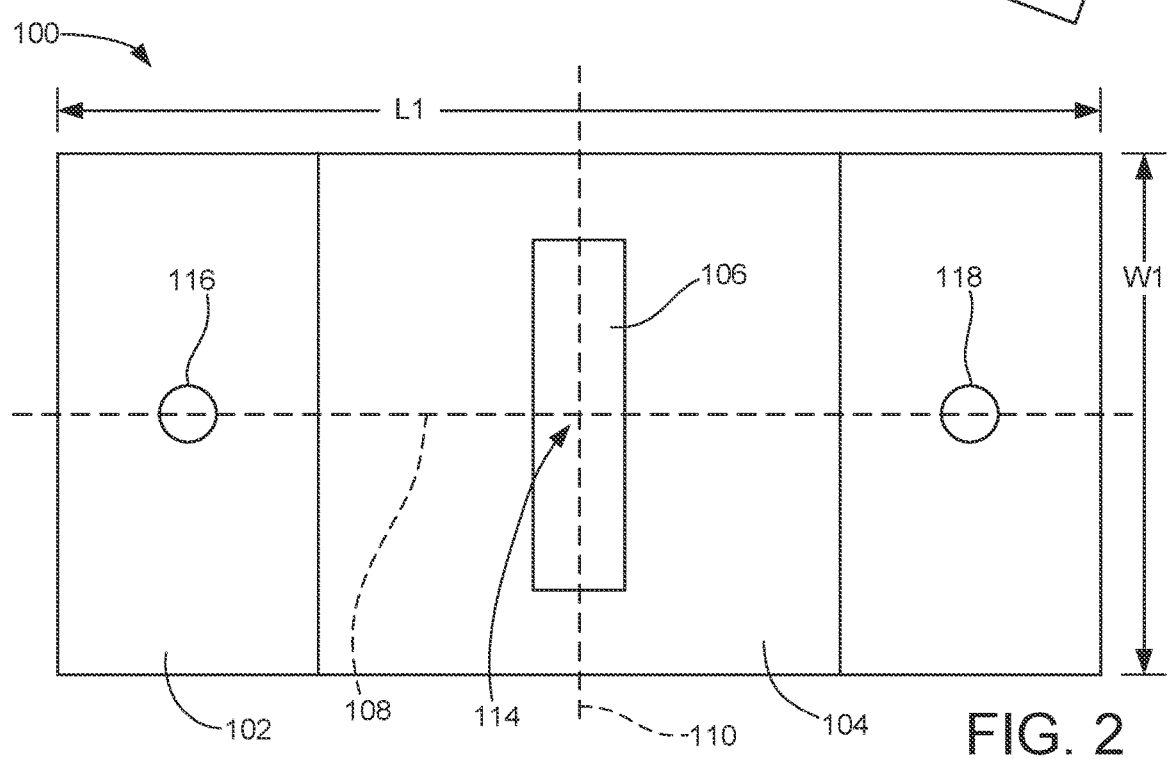
FIG. 2 is a top plan representation of the removal plate of FIG. 1.
Figure 3:
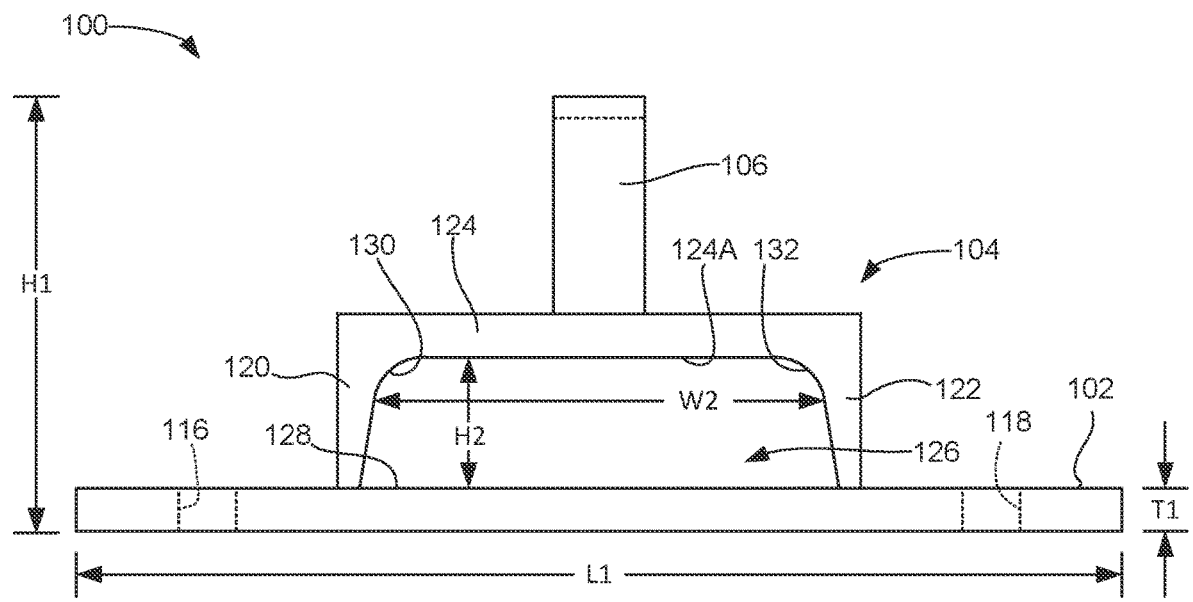
FIG. 3 is a side-elevational view of the removal plate along a first axis.

The support plate 102, also sometimes referred to as a base plate, is generally rectangular in shape, although this is merely exemplary and is not limiting. Other shapes can be readily used including square, circular, curvilinear, irregular, a star pattern, etc. The support plate 102 has an overall length (L1) and width (W1) as shown in FIG. 2, and an overall thickness (T1) as shown in FIG. 3. An overall height (H1) for the entire plate assembly 100 is also shown in FIG. 3. These respective dimensions can vary depending on the requirements of a given application.

In one non-limiting example, the length L1 is about 30 inches, in., the width is about 20 in. the thickness T1 is about 1 in., and the overall height H1 is about 10 in. Other values and aspect ratios can be used. While not necessarily required, it is contemplated in at least some embodiments that the plate assembly 100 will be heavy and strong enough to carry out the desired functions of supporting a significantly large piece of substrate while at the same time being light enough to be able to be carried and placed by one or more human operators. Placement via a lifting machine, however, can alternatively be carried out as required.

The length L1 of the support plate 102 extends along a first axis or centerline 108 (referred to as the x-direction or x-axis), and the width W1 of the base plate extends along an orthogonal second axis or centerline 110 (referred to as the y-direction or y-axis), The support plate 102 is thus nominally flat (planar) and extends along the x-y plane.

Using an axially symmetric shape about both centerlines 108, 110, such as the rectangular shape depicted in FIG. 2, enables a center of gravity (COG) of the plate to align at the midpoint 114 of the plate assembly 100 where the respective centerlines cross. This can be an advantageous feature as explained below but is not necessarily required.

Continuing with FIG. 2, the support plate 102 further includes a pair of opposing apertures 116, 118. The apertures 116, 118 extend through the thickness T1 of the support plate 102 and are used to secure the plate assembly 100 to an underlying cut section of substrate. The apertures 116, 118 are shown to be nominally aligned along the centerline 108 on opposing sides of the centrally located support bracket 104.

The support bracket 104 is best viewed in FIG. 3 and includes opposing first and second web portions 120, 122, which are attached to a top surface of, and extend upwardly from, the underlying support plate 102. A third web portion 124 extends horizontally (e.g., parallel to the x-y plane) to interconnect the first and second web portions 120, 122. This forms an interior channel 126 bounded by the interior surfaces of the respective web portions 120, 122 and 124, as well as an interior surface portion 128 of the support plate 102.

Curvilinearly extending corner surfaces 130, 132 are formed at the junctures of the first and third web portions 120, 124 and the second and third web portions 122, 124. These curvilinearly extending corner surfaces 130, 132 extend inwardly to a substantially planar underlying surface 124A of the third web portion 124 to assist in the centering of one or more forks (or other lifting mechanisms) used to lift the plate.

As a result, the interior channel 126 has interior clearance dimensions including a variable height (H2) and a variable width (W2). As bounded by the curvilinearly extending corner surfaces 130, 132, the variable height H2 of the interior channel 116 varies from about 5-6 in., and the variable width varies from about 12-16 in. Other dimensions can be used. For reference, the width of the interior channel 126 is aligned along the length L1 of the support plate 102, and the length of the channel is the same as the width of the support plate, but other configurations can be used.

Figure 4:
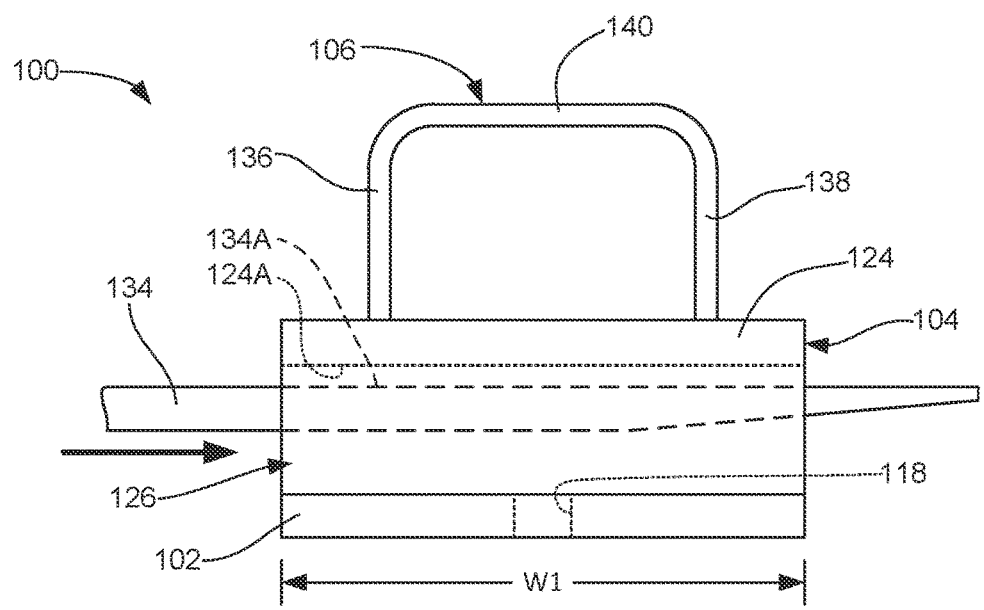
FIG. 4 is a side-elevational view of the removal plate along an orthogonal second axis.

FIG. 4 shows a portion of an exemplary fork 134 that has been extended into and through the channel 126 in FIG. 3. Once inserted, the fork 134 is slowly raised to bring an upwardly facing fork support surface 134A into contacting engagement against the downwardly facing bracket support surface 124A. Continued raising of the fork 134 at this point transfers the weight of the bracket and attached section of substrate to the fork, allowing the fork to raise the section of substrate, via the plate assembly 100, in a safe and controlled fashion. Once the section of substrate has been raised in clearing relation to remaining portions of the substrate, the fork can be moved to a suitable location for disposal of the removed section.

Continuing with FIG. 4, the handle 106 of the plate assembly 100 (see FIG. 1) includes opposing arm portions 136, 138 and a central handle portion 140 to form an interior opening therethrough (not separately numerically designated). One or more human operators can grasp the handle portion 140 to carry and place the plate assembly 100 onto the cut section of the substrate. In some cases, the fork 134 can be used to lift and place the plate assembly onto the cut section of substrate, with or without further minor adjustments by the human operator(s) to center the assembly onto the cut section in the desired location. The interior opening of the handle 106 shown to be orthogonal to the channel 126, but the handle opening can be at some other orientation including parallel to the channel.

Figure 5:
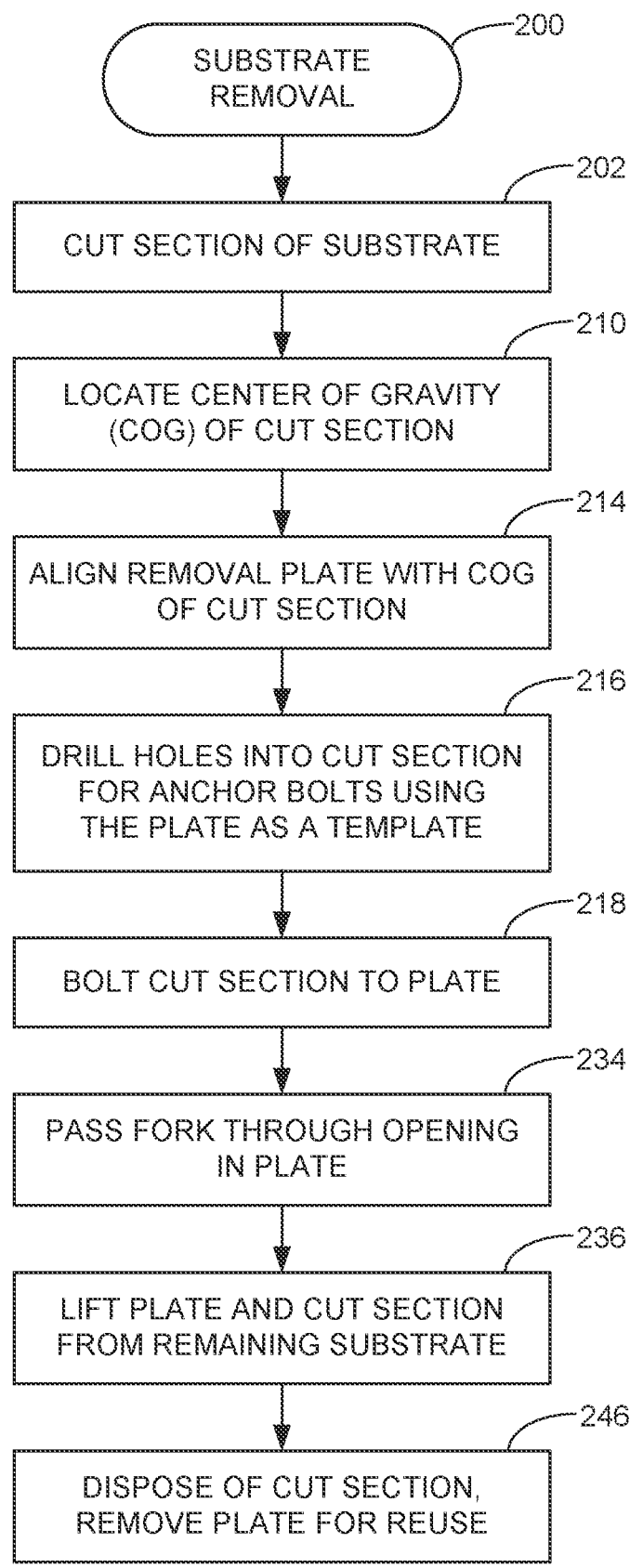
FIG. 5 is a flow chart for a substrate removal routine carried out using the removal plate in accordance with some embodiments.

FIG. 5 is a flow chart for a substrate removal routine 200 carried out in accordance with some embodiments using a plate assembly such as 100 in FIGS. 1-4. Different types and orderings of steps can be carried out depending on the requirements of a given application.

To provide a specific illustration, it will be contemplated that the routine 200 involves the removal of a cut portion of a concrete slab from a work location. It is contemplated that the slab has an overall thickness of about 4 inches and is reinforced with rebar, although this is merely exemplary and is not limiting.

Figure 6:
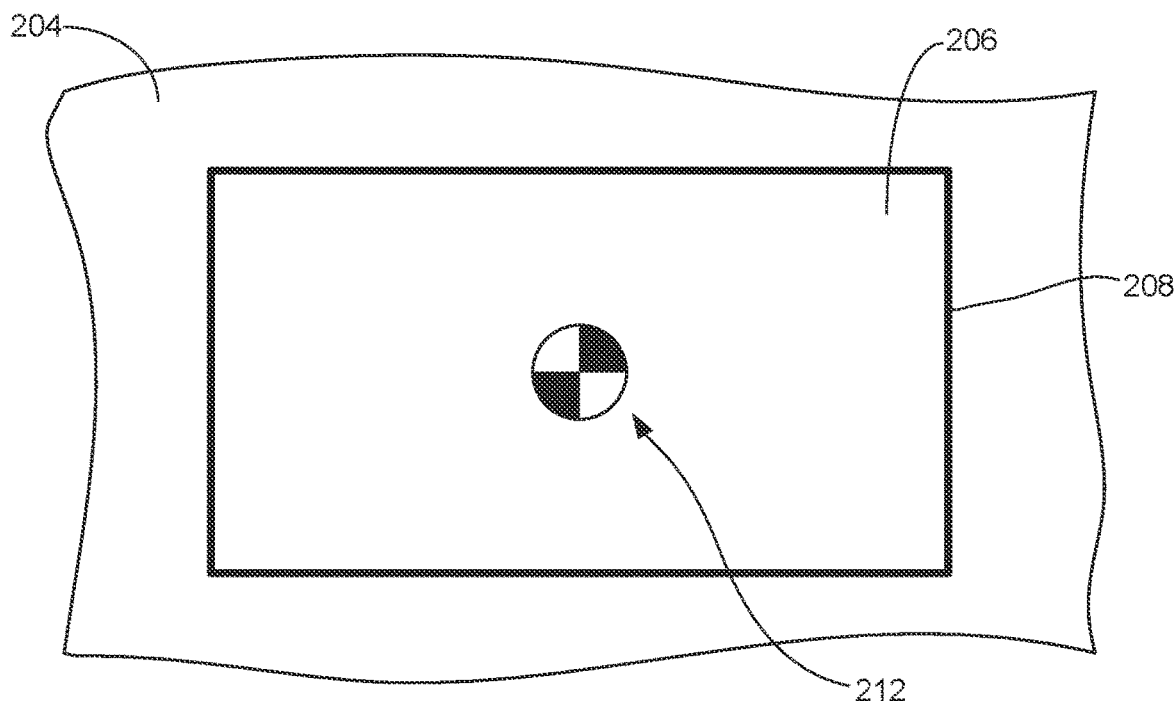
FIG. 6 illustrates a cut portion of an exemplary substrate processed in accordance with the routine of FIG. 5.

As shown at step 202, the process commences with cutting a section of substrate to be removed. This step is illustrated by FIG. 6, which provides a concrete slab 202 into which a cut portion or section 206 has been cut. The cut section 206 can be any suitable size or shape, including an irregular shape, although generally straight cut lines may be more workable in some instances. The cut section 206 in this case is generally rectangular with length and width dimensions of about 4 ft. by about 3 ft., and may have been cut using an electric, pneumatic or gasoline powered saw suitable for this purpose. A resulting gap between the cut section 206 and the rest of the substrate 204 is represented by heavy line 208.

Continuing with the routine 200 of FIG. 5, the next step is at 210 where the center of gravity (COG) of the cut section 206 is located. The COG is denoted at 212 in FIG. 6. This may be estimated based on the geometric center of the cut section 206, assuming otherwise nominally uniform material in the cut portion.

Figure 7:
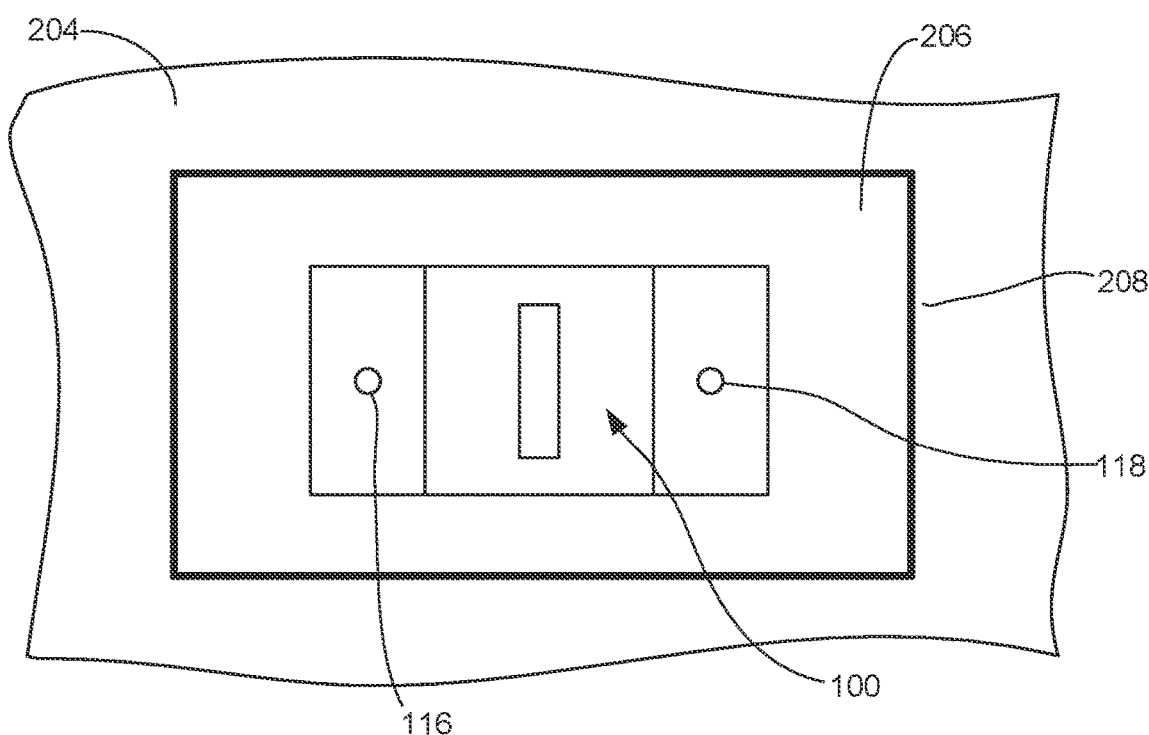
FIG. 7 shows alignment of the removal plate onto the cut portion of the substrate from FIG. 6.

The routine 200 continues at step 214 with the placement of the plate assembly 100 onto the cut section 206, as depicted in FIG. 7. The plate assembly 100 is carried by the human operator using the handle 106 and lowered onto the cut section 206 so that the COG of the support plate 102 (114, FIG. 2) is substantially aligned with the COG of the cut section (212, FIG. 6). Some offset can be tolerated, but it is contemplated that the COG of the cut section should at least fall within the footprint of the interior channel 126 (FIG. 3) to help ensure the cut section remains steadily supported by the fork.

Once the plate assembly 100 is in place on the cut section 206, the routine continues at step 216 where holes are drilled into the underlying cut section through the apertures 116, 118 of the plate assembly 100. The plate assembly 100 is contemplated as being sufficiently heavy as to remain in place during this process so the apertures can be used as a template for the drilled holes. A powered drill or other suitable equipment can be used to drill the required holes. It is contemplated that the drilled holes will be centered with and will have nominally the same, or slightly less diameter than, the apertures 116, 118.

While two (2) apertures 116, 118 are shown in the embodiment of FIGS. 1-4, any number of suitable holes, including even or odd numbers of holes, can be used. It is contemplated albeit not necessarily required that the holes will be on opposing sides of the central support bracket 104 (e.g., on opposing sides of the centerline 110 in FIG. 2) in order to ensure secure attachment of the plate assembly 100 to the underlying cut section 206.

Figure 8:
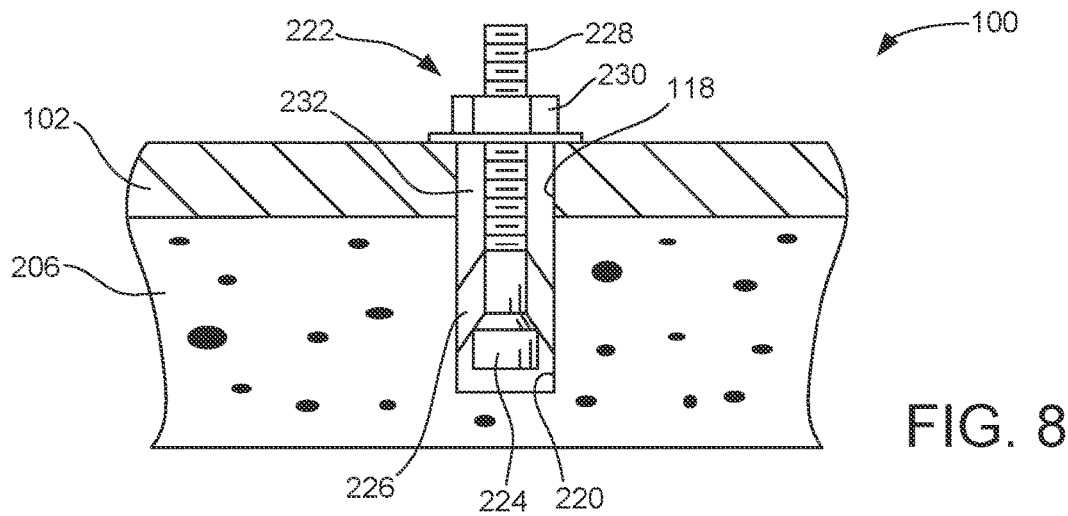
FIG. 8 is a cross-sectional, elevational depiction of portions of the plate and substrate to illustrate placement of an anchor bolt in accordance with some embodiments.

The routine continues at step 218 where the cut section 206 is bolted to the plate assembly 100 using anchor bolts or other attachment mechanisms that extend into the holes drilled during step 216. This arrangement is depicted in FIG. 8, which shows a drilled hole 220 extending into the cut section 206 of the substrate in alignment with aperture 118 in the support plate 102. An anchor bolt 222 extends through the aperture 118 and into the drilled hole 220. The anchor bolt 222 includes a lower member 224 with a tapered surface against which a gripping member 226 contactingly rides as the gripping member is advanced using a threaded shaft 228 and nut 230.

In this way, the plate 102 is contactingly secured against the cut section 206. As desired, epoxy (denoted generally at 232) can be injected into the drilled hole 220 to enhance the interconnection. It will be appreciated that any number of attachment mechanisms can be used to extend through the plate aperture 118 and into the substrate aperture 220 as desired, so the particular example in FIG. 8 of an anchor bolt with epoxy is merely illustrative and is not limiting.

Once secured, the routine of FIG. 5 continues at step 234 where a lifting mechanism, such as one or more forks of a fork lift, are passed though the interior channel 126 of the plate assembly 100 (see FIGS. 3-4). Once inserted, the cut section 206 and the plate assembly 100 are lifted by the lifting mechanism in step 236.

Figure 9:
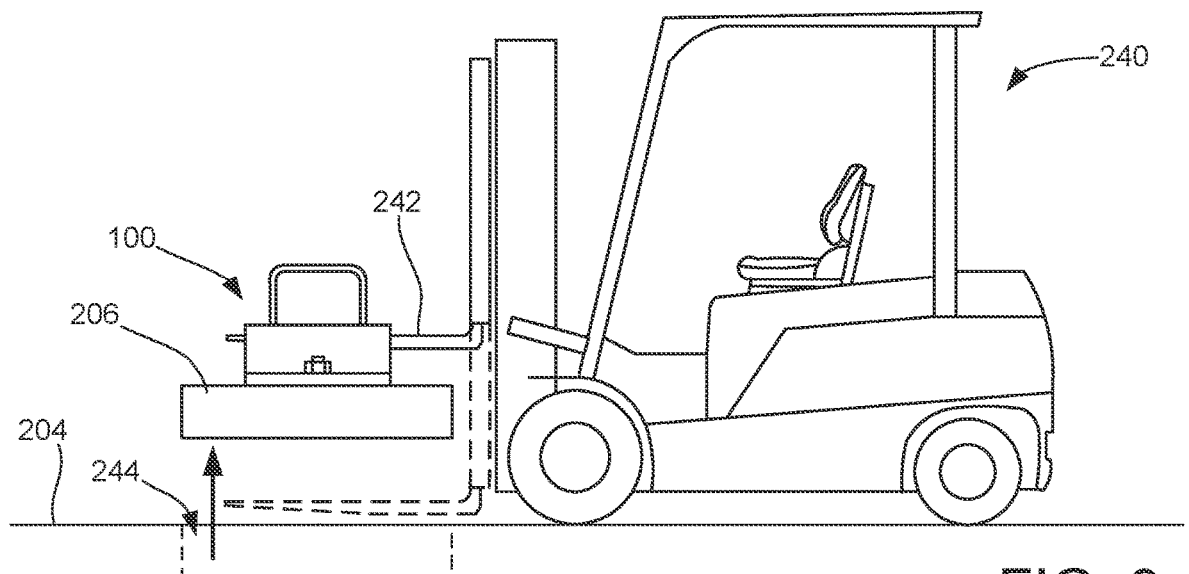
FIG. 9 shows a lifting mechanism in the form of a fork lift utilized to lift the plate and the cut section of the substrate in accordance with the routine of FIG. 5.

An example lifting mechanism 240 (fork lift) and accompanying fork 242 are shown in FIG. 9. The fork 242 is similar to the fork 134 shown above in FIG. 4 and is used to raise the cut section 206 from the underlying substrate 204. A void 244 will remain in the underlying substrate 204 that corresponds to the space that the cut section 206 formerly occupied.

As shown by step 246 in FIG. 5, The cut section 206 is moved by the lifting mechanism 240 to a suitable disposal location, such as a dumpster, pile, etc. This can involve the driving of the fork lift 240 by the operator to the disposal location. In some cases, the plate assembly 100 is removed from the cut section 206 by removal of the attachment mechanism. This may include the loosening and removal of the anchor bolts, the breaking or softening/dissolving of the epoxy, etc. Once removed, the plate assembly 100 is available for reuse, in which case the routine returns back to step 202 to process a new section of cut substrate, including a portion that adjoins the void 244 in FIG. 9.

Figure 10:
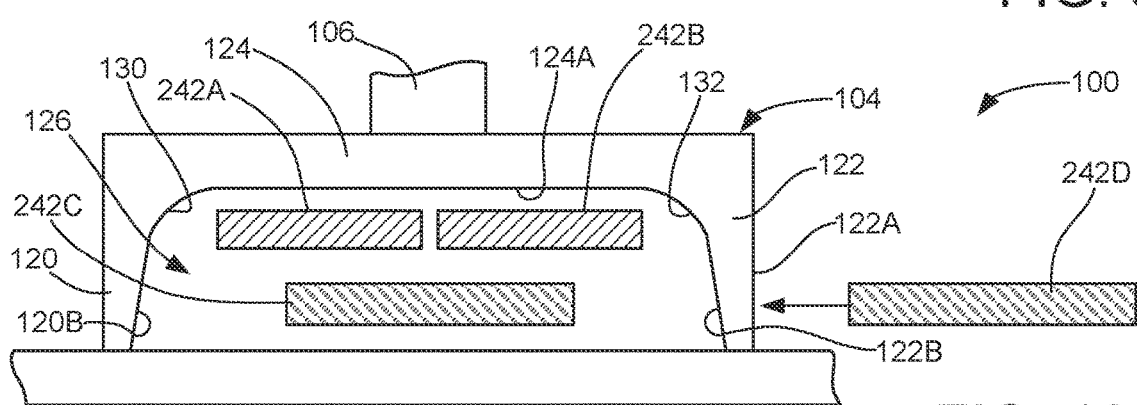
FIG. 10 is an end-view representation of FIG. 9 illustrating further aspects of some embodiments of the present disclosure.

FIG. 10 shows the plate assembly 100 in accordance with further embodiments. In FIG. 10, different numbers and configurations of forks may be used to lift the plate assembly 100 and underlying substrate 206. Some fork lifts 240 have a pair of forks 242A, 242B that have the capability of moving laterally towards and away from each other to accommodate different inter-fork spacing positions. In this case, the two forks 242A, 242B are positioned so as to be in close proximity to one another, allowing both forks to be inserted into the channel 126.

In other cases, forks such as 242C, 242D are not laterally moveable or are otherwise sized such that both forks will not fit within the interior dimensions of the channel 126. In this case, an alternative lifting sequence can be used such that a single fork (in this case, fork 242C) is inserted into the channel 126 and used to lift the plate assembly 100 and cut section 206. The remaining fork 242D is not used as part of the lifting process; however, in yet another alternative embodiment, the forks 242C and 242D may be brought sufficiently close together such that the exterior fork 242D is brought into contacting engagement or close proximity to an outer surface 122A of the web portion 122 to further steady and support the lifted plate and section.

The interior channel 126 is thus defined by base surface 102A, angled interior sidewall surfaces 120B, 122B of the opposing first and second web portions 120, 122, the curvilinearly extending corner surfaces 130, 132, and the substantially flat upper surface 124A. While other interior channel configurations can be used, this configuration is of particular use in enabling the operator to safely and accurately insert and lift the fork(s) into the interior channel 126 and ensure that the inserted fork(s) are sufficiently and stably centered within the channel prior to and during the lifting operation. To this end, spaced part projections or grooves (not separately shown in FIG. 10) can be provided in the facing surfaces of the interior channel 126, such as the support surface 126A, to further ensure desired contact and support.

Figure 11:
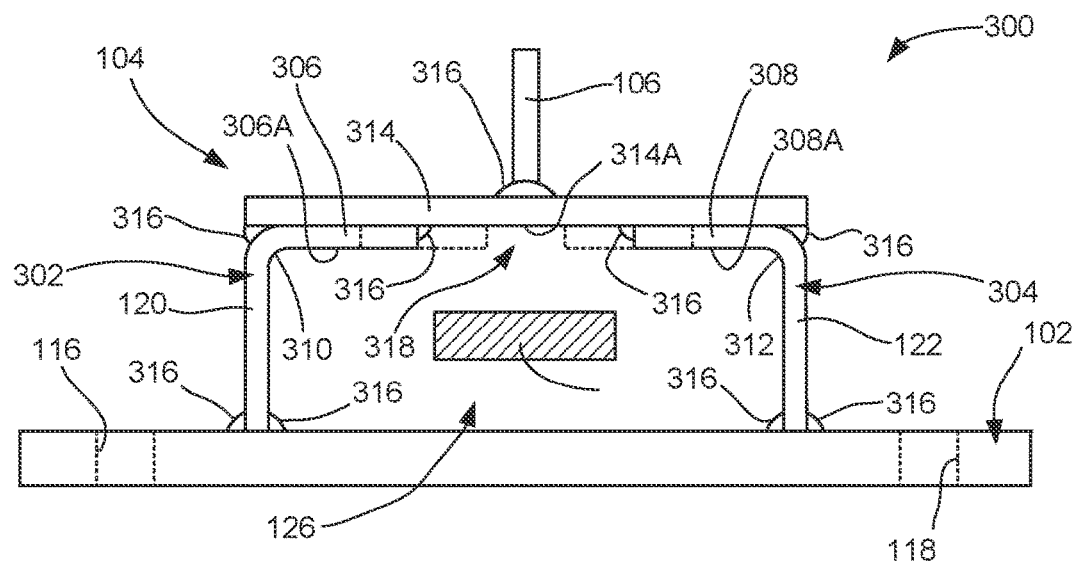
FIG. 11 is a side-elevational view of another plate assembly constructed and operated in accordance with further embodiments of the present disclosure.
Figure 12:
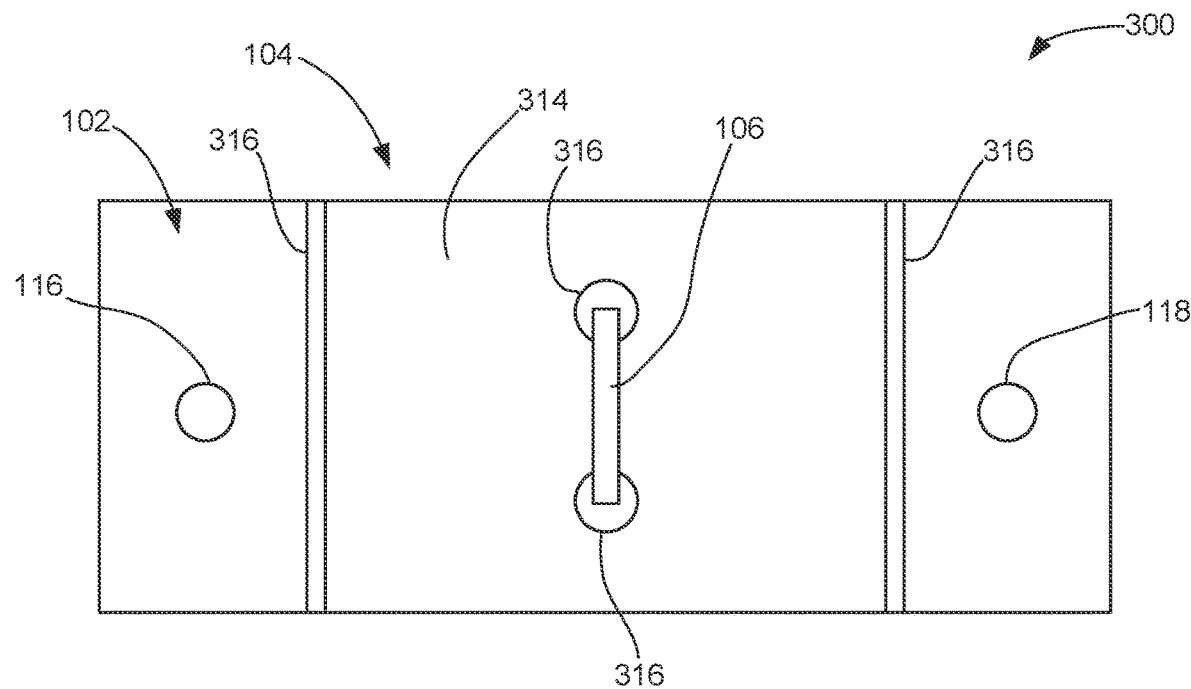
FIG. 12 is a top plan view of the plate assembly of FIG. 11.

FIGS. 11 and 12 provide another plate assembly 300 similar to the plate assembly 100 discussed above. As such, like reference numerals have been supplied for similar elements. It is contemplated although not necessarily required that the plate assembly 300 is smaller in size than the plate assembly 100.

As before, the plate assembly 300 is configured to enable the attachment, lifting and removal of a section of an underlying substrate, such as but not limited to a cut section of concrete from an underlying slab, and has general elements including a base plate 102, bracket portion 104 and handle 106. However, one difference in the configuration of FIGS. 11 and 12 is that the support bracket 104 is formed from a pair of opposing angled plates 302, 304. The plates 302, 304 are plate steel or similar bent at an appropriate angle at a mid-location thereof to provide vertical web portions 120, 122 and horizontal web portions 306, 308. Corner portions 310, 312 are provided at the bends between the vertical and horizontal portions at any suitable radius of curvature. While a bend angle of nominally 90 degrees is shown for the plates 302, 304, other angles can be used, including angles that are greater or less than 90 degrees to provide a desired cross-sectional shape to the channel opening 126.

A horizontal web portion 314 of the support bracket 104 generally corresponds to the third web portion 126 discussed above, but is configured as a flat plate that is adjoined to and supported by the horizontal web portions 306, 308. Welds 316 are shown at various locations to interconnect the respective members. It will be appreciated that other forms of interconnections can be used as desired, so the depiction of welds is merely illustrative and is not limiting. Similarly, different sizes and shapes of the various members can be used to suit the requirements of a given application.

A recess 318 is provided along the underside of the horizontal web portion (plate) 314. This recess is a channel or gap between the distal ends of the horizontal web portions 306, 308. While not necessarily required, this recess 318 can be sized to accommodate nesting placement of a fork 320 therein. In this way, the fork 320 is supported by downwardly facing support surface 314A of the upper plate 314 and supported and/or bounded by the distal ends of the web portions 306, 308. This nesting arrangement can provide enhanced stability and reduce slippage as the fork lift or other lifting mechanism transports the supported section of substrate.

The width of the recess 318 can be widened or narrowed as shown by broken lines in FIG. 11 to accommodate different widths of forks. Alternatively, the fork 320 (or a pair of laterally adjustable forks) can be inserted into the channel 126 and bear against respective support surfaces 306A, 308A of the horizontal web portions 306, 308.

As noted above, the plate assembly 300 may be smaller in size than the plate assembly 100 discussed above, although this is not necessarily required. In one embodiment, the base plate 102 in FIGS. 11 and 12 is about 14 inches in length by about 6 inches in width; the top plate 314 is about 8 inches in length by about 6 inches in width; the interior channel 126 has a variable height of around 3 inches and a variable interior width of about 7 inches; the recess 318 can be anywhere from nominally 0 inches upwards of close to 6 inches or more; the base plate 102 can be ¾ in. thick steel plate; the top plate 314 can be ½ in. thick steel plate; the bent members 302, 304 can be formed from ⅜ in. thick steel plate bent to a suitable angle, and the apertures 116, 118 can be ⅞ in. in diameter. Other dimensions and values can be used.

While not required, the use of bent portions in the support bracket 104 as shown by 302, 304 in FIG. 11 can provide additional strength and, as required, a recessed channel (e.g., 318) to further stabilize the loading of the plate assembly 300. Forks with substantially any width, such as but not limited to forks with widths of around 4-6 inches, can be readily accommodated.

While forklifts have been contemplated as particularly suitable lifting mechanisms, other forms of lifting mechanisms, including but not limited to manually advanced hydraulic lifting systems, can be utilized as well. While any number of shapes and configurations of plates can be used, the length, width and thickness dimensions of the plate, as well as the dimensions of the substrate portion supported thereby, should be selected so as to be accommodated by the lifting mechanism.

It will now be appreciated that the various embodiments presented herein provide a number of advantages and benefits over the existing art. Providing a plate with a bracket portion that defines an interior chamber as described herein enables an operator to safely and precisely insert and raise a fork to lift the plate assembly, and an attached section of substrate, in a safe and effective manner. Personnel can be used to place the plate in the desired location, and the plate can be used as a template to make the underlying attachment to the substrate.

For purposes of the appended claims, it will be understood that reference to various dimensions such as length, width and thickness are taken along orthogonal directions, but do not otherwise have any specific limitations other than those set forth by the claim language so that, for example, it is not necessarily required that the length be greater than the width, and so on.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising:
 a support plate configured for contacting placement upon a section of an underlying substrate for lifting thereof, the support plate having an outermost perimeter with a width, a length and a thickness, a first aperture on a first side of a centerline of the support plate that bisects the length and a second aperture on an opposing second side of the centerline, each of the first and second apertures extending through the thickness of the support plate to accommodate a corresponding attachment mechanism to secure the support plate to the section of the underlying substrate; and
 a support bracket that extends upwardly from a medial portion of the support plate opposite the section of the underlying substrate and between the first and second apertures, the support bracket comprising a first vertical web portion on the first side of the centerline, a second vertical web portion on the second side of the centerline, a first horizontal web portion extending from the first vertical web portion towards the centerline, a second horizontal web portion extending from the second vertical web portion towards the centerline, and a third horizontal web portion substantially parallel to the support plate that adjoins the first and second horizontal web portions to define an interior channel bounded by the support plate and the support bracket, the interior channel configured to accommodate insertion of a fork of a lifting mechanism to contactingly engage a downwardly facing support surface of the third horizontal web portion and lift the support plate and section of the underlying substrate to a desired height, the downwardly facing support surface of the third horizontal web portion disposed within a recess of the interior channel, the recess bounded by vertically extending distal ends of the first and second horizontal web portions, the vertically extending distal ends of the first and second horizontal web portions configured to contactingly engage side surfaces of the fork to enhance stability during transport of the underlying substrate.

2. The apparatus of claim 1, further comprising a handle attached to an upper surface of the support bracket opposite the interior channel, the handle configured to be grasped by a human operator for placement of the support plate in a centered location upon the section of underlying substrate.

3. The apparatus of claim 1, wherein the interior channel has a first overall interior width distance between the first and second vertical web portions, wherein the recess has a second overall interior width distance between the vertically extending distal ends of the first and second horizontal web portions less than the first overall interior width distance, and wherein the recess has a depth distance in a vertical direction corresponding to a thickness of the respective first and second horizontal web portions.

4. The apparatus of claim 1, wherein the support plate is substantially rectangular in shape, and wherein the length thereof is greater than the width thereof.

5. The apparatus of claim 1, wherein centerline is a first centerline, the width of the support plate is bisected by a second centerline, and the first and second apertures are nominally aligned with the second centerline.

6. The apparatus of claim 1, wherein the first and second vertical web portions and the first and second horizontal web portions are portions of first and second angled members that are bent at a medial location at a selected angle, wherein the third horizontal web portion is a flat plate affixed to upwardly facing support surfaces of the first and second angled members, and wherein the recess is defined by the flat plate and the vertically extending distal ends of the first and second horizontal web portions, the recess configured to nestingly receive the fork.

7. The apparatus of claim 1, wherein the section of underlying substrate comprises a cut section of substrate material lifted by placing the support plate onto the cut section, drilling first and second drilled holes into the cut section that are axially aligned with the first and second apertures, installing a first attachment mechanism through the first aperture and the first drilled hole, installing a second attachment mechanism through the second aperture and the second drilled hole, inserting a fork of a lifting mechanism through the interior chamber, and raising the fork to lift the support bracket, the support plate and the cut section.

8. The apparatus of claim 1, wherein the support plate has an upwardly facing surface defined by the length and the width of the support plate that extends along a first horizontal plane, the first web portion has a substantially vertical exterior sidewall surface orthogonal to the first horizontal plane and an opposing tapered interior sidewall surface non-orthogonal to the first horizontal plane and an interior curvilinearly extending corner surface that continuously extends at a selected radius of curvature from the interior sidewall surface to a first end of the downwardly facing support surface of the third web portion, the downwardly facing support surface of the third web portion extending along a second horizontal plane parallel to the first horizontal plane.

9. The apparatus of claim 8, wherein the second web portion is mirrored with respect to the first web portion so that the second web portion has a substantially vertical second exterior sidewall surface orthogonal to the first horizontal plane and an opposing tapered second interior sidewall surface non-orthogonal to the first horizontal plane and a second interior curvilinearly extending corner surface that continuously extends at the selected radius of curvature from the interior sidewall surface to an opposing second end of the downwardly facing support surface of the third web portion.

10. A plate assembly adapted to lift a cut section from an underlying concrete slab, the plate assembly comprising:
a flat support plate configured for contacting placement onto the cut section so that a centerline of the support plate nominally aligns with a center of gravity (COG) of the cut section, the support plate comprising opposing first and second through-hole apertures that extend through a thickness of the support plate on opposing sides of the centerline;
a support bracket affixed to the support plate to define an interior channel sized and shaped to receive insertion of a fork of a lifting mechanism, the support bracket comprising:
a first angled plate comprising a first vertical web portion extending upwardly from the support plate on a first side of the centerline and a first horizontal web portion extending inwardly towards the centerline;
a second angled plate comprising a second vertical web portion extending upwardly from the support plate on an opposing second side of the centerline and a second horizontal web portion extending inwardly in facing relation towards the first horizontal web portion; and
a horizontal upper plate that adjoins and is supported by respective upwardly facing support surfaces of the first and second horizontal web portions of the first and second angled plates to define a recess within the interior channel configured to nestingly receive and retain the fork;
first and second attachment mechanisms configured for insertion through the respective first and second through-hole apertures in the support plate to secure the support plate to the cut section; and
a user handle which extends upwardly from a medial location of the support bracket configured to enable a human operator to place the support plate onto the cut section.

11. The plate assembly of claim 10, wherein each of the first and second horizontal web portions have a vertically extending distal end, wherein the recess is defined by a downwardly facing support surface of the horizontal upper plate and the vertically extending distal end of each of the first and second horizontal web portions, and wherein the distal end of each of the first and second horizontal web portions is configured to contactingly support a respective side of the fork during transport of the cut section from an underlying concrete slab using the plate assembly.

12. The plate assembly of claim 11, wherein the second angled plate is nominally identical to and mirrored with respect to the first angled plate.

13. The plate assembly of claim 11, wherein the cut section is lifted from the underlying slab by steps comprising: placing the support plate onto the cut section, drilling first and second drilled holes into the cut section that are axially aligned with the first and second apertures, installing the first attachment mechanism through the first aperture and the first drilled hole, installing the second attachment mechanism through the second aperture and the second drilled hole, inserting a fork of a lifting mechanism through the interior chamber, and raising the fork to nest the fork within the recess and lift the support bracket, the support plate and the cut section through contacting engagement of an upper support surface of the fork against a downwardly facing bracket surface of the horizontal upper plate.

14. The plate assembly of claim 10, wherein each of the first and second attachment mechanisms comprises an anchor bolt.

15. The plate assembly of claim 14, wherein each of the first and second attachment mechanisms further comprises epoxy.

16. A method comprising:
placing a plate assembly onto a cut section from an underlying substrate, the plate assembly comprising a support plate and a support bracket that extends from a medial portion of the support plate to define an interior channel, the support plate further having first and second through-hole apertures on opposing sides of the support bracket, the interior channel having a first pair of interior facing vertical surfaces to define an overall width of the interior channel, a second pair of interior facing vertical surfaces to define a recess having a reduced width smaller than the overall width, and a pair of spaced apart, downwardly facing horizontal surfaces disposed between the first pair of interior facing vertical surfaces and the second pair of interior facing vertical surfaces;
securing the plate assembly to the cut section using first and second attachment mechanisms that extend through the first and second through-hole apertures and into the cut section;
inserting a fork of a lifting mechanism into the interior channel to nest the fork into the recess between the second pair of interior facing vertical surfaces; and
raising the fork of the lifting mechanism to contactingly engage a downwardly facing, horizontal interior surface of the recess and lift the plate assembly and the cut section from the underlying substrate.

17. The method of claim 16, wherein the first pair of interior facing vertical surfaces extend from first and second vertical web portions extend upwardly from the support plate on opposing sides of a centerline of the support plate and between the centerline and the first and second apertures.

18. The method of claim 16, wherein the plate assembly is placed onto the cut section by a human operator which grasps a user handle of the plate assembly which extends upwardly from a medial portion of the support bracket.

19. The method of claim 16, further comprising drilling first and second drilled holes into the cut section that are axially aligned with the first and second through-hole apertures in the support plate, wherein the first and second attachment mechanisms comprise anchor bolts that are inserted through the first and second apertures and into the first and second drilled holes.

20. The method of claim 16, wherein the lifting mechanism is a fork lift having first and second laterally moveable forks, and wherein the method further comprises bringing the first and second laterally moveable forks into close proximity or contacting abutment one with another and concurrently inserting both the first and second laterally moveable forks into the interior channel defined by the support bracket.

* * * * *